(12) United States Patent
Ogden

(10) Patent No.: US 9,601,947 B2
(45) Date of Patent: Mar. 21, 2017

(54) SEISMICALLY RESPONSIVE UTILITIES CONTROL SYSTEM WITH OCCUPANCY ACTIVATION MECHANISM

(71) Applicant: Everett Ogden, Ponte Vedra Beach, FL (US)

(72) Inventor: Everett Ogden, Ponte Vedra Beach, FL (US)

( * ) Notice: Subject to any disclaimer, the term of this patent is extended or adjusted under 35 U.S.C. 154(b) by 976 days.

(21) Appl. No.: 13/898,090

(22) Filed: May 20, 2013

(65) Prior Publication Data
US 2013/0307350 A1 Nov. 21, 2013

Related U.S. Application Data

(60) Provisional application No. 61/648,790, filed on May 18, 2012.

(51) Int. Cl.
*H02J 17/00* (2006.01)
*G01V 1/00* (2006.01)
*G05D 7/06* (2006.01)
*F17D 5/00* (2006.01)

(52) U.S. Cl.
CPC ............... *H02J 17/00* (2013.01); *F17D 5/00* (2013.01); *G05D 7/0617* (2013.01); *G01V 1/008* (2013.01); *Y10T 137/1842* (2015.04); *Y10T 307/786* (2015.04)

(58) Field of Classification Search
CPC ... F17D 5/00; H02J 17/00; H02J 50/40; H02J 50/20; H02J 50/15; G01V 1/008; G01V 1/00; G05D 7/0617
See application file for complete search history.

(56) References Cited

U.S. PATENT DOCUMENTS

| 4,841,287 | A | * | 6/1989 | Flig | .......................... F16K 17/36 137/39 |
|---|---|---|---|---|---|
| 5,143,110 | A | | 9/1992 | Simpson | |
| 5,240,022 | A | * | 8/1993 | Franklin | ............... F16K 5/0647 137/1 |
| 5,655,561 | A | * | 8/1997 | Wendel | ................. G01F 23/243 137/312 |
| 7,458,387 | B2 | | 12/2008 | McGill | |
| 2002/0170595 | A1 | * | 11/2002 | Oliver | ...................... G05B 9/02 137/38 |
| 2003/0075670 | A1 | * | 4/2003 | Tuominen | ........... H04B 10/807 250/205 |
| 2008/0157606 | A1 | * | 7/2008 | Fukutome | ............ H04B 1/0003 307/126 |
| 2012/0274440 | A1 | * | 11/2012 | Meadows | .............. G01V 1/008 340/3.42 |

* cited by examiner

*Primary Examiner* — Rexford Barnie
*Assistant Examiner* — Terrence Willoughby
(74) *Attorney, Agent, or Firm* — Thomas C. Saitta

(57) ABSTRACT

A utilities control system with a DC powered control system located within a building or room and having in combination an occupant activation device, a seismic sensor and a wireless transmitter; a wireless receiver in combination with a utilities shut-off device, and whereby upon either a change in status of the occupant activation device or the sensing of a seismic event by the seismic sensor, a signal is transmitted from the wireless transmitter to the wireless receiver such that the utilities shut-off device is activated to stop delivery of utilities.

14 Claims, 2 Drawing Sheets

SEISMICALLY RESPONSIVE UTILITIES CONTROL SYSTEM WITH OCCUPANCY ACTIVATION MECHANISM

This application claims the benefit of U.S. Provisional Patent Application Ser. No. 61/648,790, filed May 18, 2012, the disclosure of which is incorporated herein by reference.

BACKGROUND OF THE INVENTION

This invention relates generally to commercial and residential utilities (water, gas, electricity) supply shutoff and more particularly to automatically shutting off the utilities in the event of a seismic event, and to especially wireless systems manually controlled by an occupancy activation mechanism such that the utility systems are functional only when the structure is occupied.

In most cases people leave their homes during the day to carry on day to day activities of life and business. Likewise, there are many hours where entire commercial buildings or particular rooms within a building, such as in hotels, may be unoccupied. The residences, rooms or buildings may be empty for a few hours or multiple days. During this absence from the residence or business unforeseen events such as earthquakes, fires, tornados, etc., could take place that could cause localized internal damage to water, gas and electrical systems. This damage may result in water flooding, gas explosions or electrical fires within the structure.

With regard to potential flooding from burst or damaged pipes, some owners have installed automated water valve shutoff systems that shut off the flow of water into the room or building by various means, such as upon detection of excessive water flow volume, water sensor detectors positioned on the floors of the building to detect large leaks or discharges, or even a simple manual pushbutton shutoff. Other devices are known for the control of electricity and gas in similar situations. While the known utility control devices address some of the potential problems, they have shortcomings. One major problem is that the current safety water valve and controller systems operate off of AC voltage, such that during power loss the valve and controller will not be operational.

For earthquake scenarios, what is needed is a valve and/or circuit breaker and controller system that operates utilizing a DC power source. i.e., battery power, that utilizes a seismic sensing system to initiate control of the valve. This invention will detect and analyze the precursors of the destructive earthquake waves that propagate in advance of the major destructive waves, activating the shut-off valve or circuit breaker prior to any major damage. It is an object of this invention to provide such a device and system. It is a further object that the system be adapted for buildings or individual rooms within a building whereby an affirmative action by the occupant of the building or room, such as the insertion and presence of a removable room card, such as a room key in a hotel for example, in the controller is required to activate or allow water flow, gas flow, or electrical power to the building or room.

SUMMARY OF THE INVENTION

The invention is in general a seismically responsive utilities control system with an occupancy activation mechanism, whereby in the event of non-occupancy of a building or room or in the event of an earthquake the flow of utilities (e.g., water, gas and/or electricity) into the building or room is shut-off to prevent potentially hazardous conditions and damage from flood, explosion or fire.

The system comprises an occupancy activated control assembly that wirelessly communicates with utility shut-off devices, such as water valves, gas valves and/or electrical circuit breakers, to shut-off the utilities when desired or in the event of a seismic occurance. The control assembly wirelessly communicates with the valves and circuit breakers, one or more transmitters being associated with the control assembly and receivers being associated with the valves and circuit breaker. The control assembly is powered by one or more DC power sources, i.e., batteries, such that it may be easily retrofitted into existing structures without need for extensive rewiring. Occupancy activation is preferably accomplished by requiring the insertion and presence of a physical card or similar member within the control assembly, the card blocking passage of a light beam from a light emitter to a light detector, such that removal of the card activates the shut-off function of the utility shut-off devices. The utility shut-off devices may be self-powered by DC power or connected to the electrical grid, whereby a signal received from the control assembly or loss of electrical power activates the shut-off functionality of the device.

In other terms, the invention is a utilities control system comprising a DC powered control system located within a building or room and comprising in combination an occupant activation device, a seismic sensor and a wireless transmitter; a wireless receiver in combination with a utilities shut-off device; whereby upon either a change in status of said occupant activation device or the sensing of a seismic event by said seismic sensor, a signal is transmitted from said wireless transmitter to said receiver such that said utilities shut-off device is activated, and wherein said occupant activation device comprises the combination of a light transmitter, a light detector and a removable light blocking member positioned to prevent light from said light transmitter from reaching said light detector, whereby removal of said light blocking member changes the status of said occupant activation device such that said signal is transmitted from said wireless transmitter to said receiver activate said utilities shut-off device.

In still other terms, the invention is a utilities control system comprising a wall-mounted, DC powered control system located within a building or room and comprising in electronic communication an occupant activation device, a seismic sensor and a wireless transmitter; one or more utilities shut-off devices each in electronic communication with a wireless receiver; wherein said occupant activation device comprises the combination of a light transmitter, a light detector, a slotted card receiver and a removable light blocking member positionable within said slotted card receiver to prevent light from said light transmitter from reaching said light detector, whereby insertion of said light blocking member into said slotted card receiver sends a signal from said wireless transmitter to said one or more wireless receivers to allow utilities to be delivered and whereby removal of said light blocking member from said slotted card receiver sends a signal from said wireless transmitter to said one or more wireless receivers to activate said utilities shut-off device and stop delivery of said utilities; and further whereby upon the sensing of a seismic event by said seismic sensor, a signal is transmitted from said wireless transmitter to said one or more wireless receivers to activate said utilities shut-off device and stop delivery of said utilities even if said light blocking member is positioned within said slotted card receiver.

DETAILED DESCRIPTION OF THE INVENTION

Figure 1:
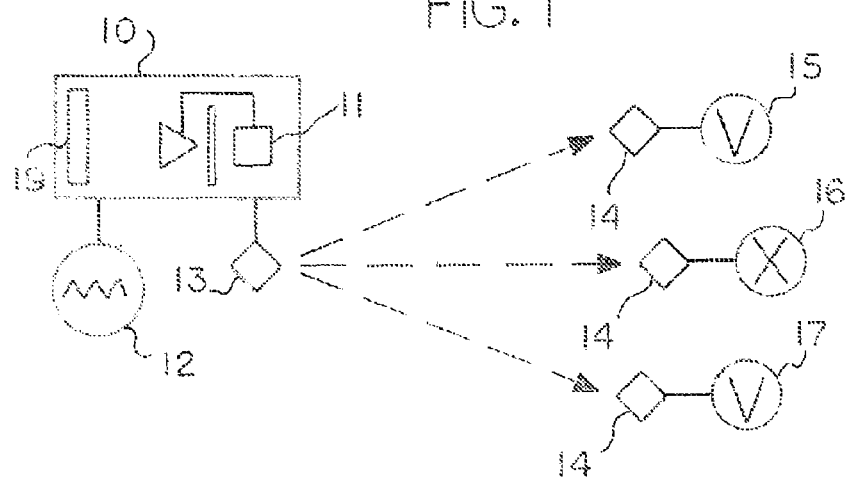
FIG. 1 is a schematic embodiment of the system illustrating occupancy activated, seismically responsive control of water flow, electrical power and gas flow.

With reference to the drawings, the various aspects and embodiments of the invention will now be described. The invention is in general a seismically responsive utilities control system with an occupancy activation mechanism, whereby in the event of non-occupancy of a building or room or in the event of an earthquake the flow of utilities (e.g., water, gas and/or electricity) into the building or room is shut-off to prevent potentially hazardous conditions and damage from flood, explosion or fire. As illustrated schematically in FIG. 1, the invention comprises a control assembly 10 adapted for placement within a building or room, the control assembly 10 comprising a DC power source 19, a circuit board 20, an occupancy activation device 11, a seismic sensor 12 and a wireless radio frequency transmitter 13. The control assembly 10 wirelessly controls operation of one or more utility shut-off devices, such as a water valve 15, electrical circuit breaker 16, and gas valve 17 through receivers 14.

Figure 2:
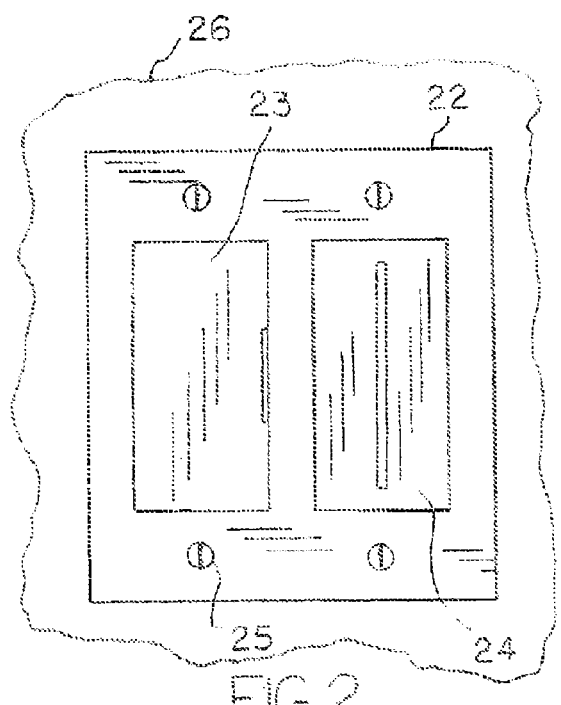
FIG. 2 is a view of an embodiment showing the control assembly as mounted on a wall.
Figure 3:
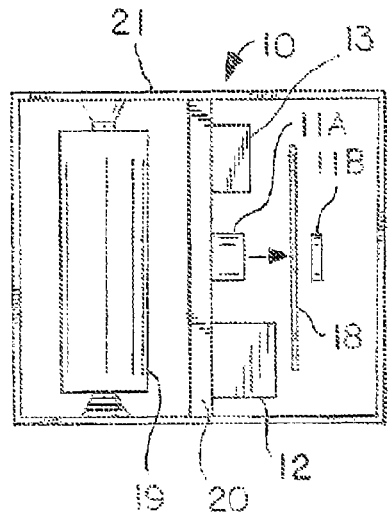
FIG. 3 is a view of the control assembly of FIG. 2 with the faceplate removed to expose the internal components.

FIGS. 2 and 3 illustrate an embodiment of the control assembly 10 suitable for placement into the walls of a room or building and particularly suitable for retrofitting existing rooms or buildings without the need for rewiring to bring electrical power to the control assembly 10. The control assembly 10 comprises a housing 21, such as a common J-box used in the placement of wall-mounted electrical switches and outlets and readily mounted to studs within wallboard cut-outs, and a faceplate 22 abutting the wall 26, the faceplate 22 being secured to the housing 21 in known manner with mechanical fasteners 25. The control assembly 10 is powered by a DC power source 19, i.e., one or more batteries, that are preferably accessible through a battery compartment door 23 for easy replacement of the batteries.

The control assembly 10 further comprises an occupancy activation device 11 whereby an affirmative action must be initiated to activate and allow flow of the utilities to the building or room and further wherein a change in status of the occupancy activation device 11 results in termination of delivery of utilities. As shown in this embodiment, the occupancy activation device 11 is an optical switch comprising a light transmitter 11A, such as a light emitting diode, and a light detector 11B. Light detector 11B may incorporate a mirror such that the light beam is bounced back toward a circuit board 20 so that the electronic components of the light detector 11B can be mounted thereon. In this manner a light blocking member 18, such a thin card, hotel room key or the like, is inserted through a slotted card receiver 24 disposed in the control assembly housing 21 such that it blocks the light emitted from light transmitter 11A from reaching the detector 11B. The presence of the light blocking member 18 results in a signal transmitted by the transmitter 13 to the one or more receivers 14 to allow delivery of the utilities. This status signifies that the room or building is occupied and therefore the utilities should be operational. Removal of the light blocking member 18 results in the transmission of a radio frequency signal from the control assembly transmitter 13 to the one or more utility shut-off devices 15, 16 and 17 to initiate shut-off of the utilities. Upon subsequent re-insertion of the light blocking member 18, supply of the utilities to the room or building is reinstated.

Figure 4:
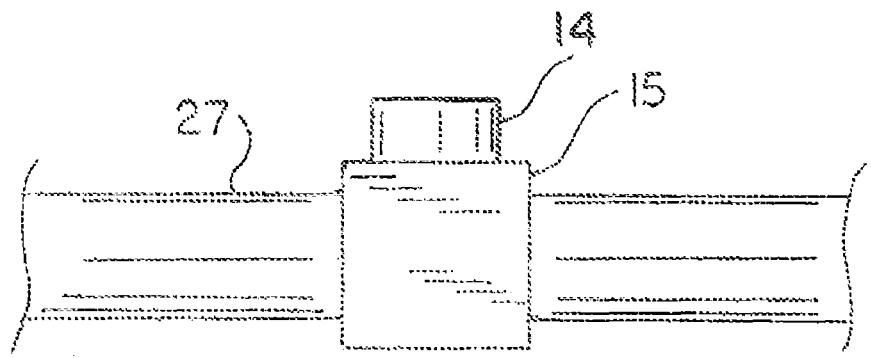
FIG. 4 is an illustration of a water valve and wireless receiver in conjunction with a water pipe.
Figure 6:
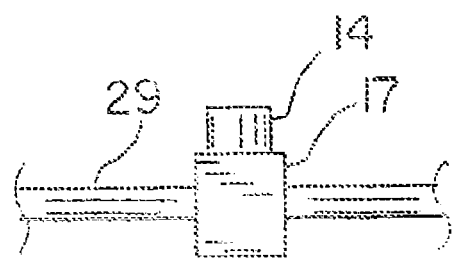
FIG. 6 is an illustration of a gas valve and wireless receiver in conjunction with a gas line.
Figure 5:
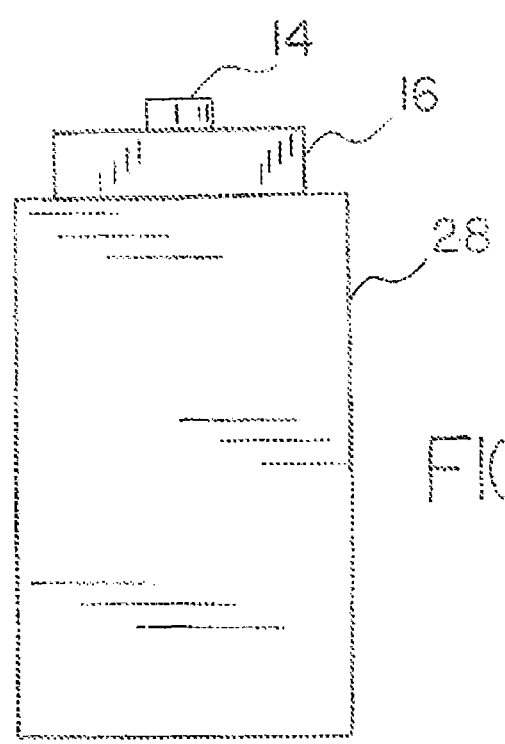
FIG. 5 is an illustration of a circuit breaker and a wireless receiver in conjunction with an electrical breaker box.

The utility shut-off devices 15, 16 and 17, as shown in FIGS. 4-6, may be of any suitable type known in the art that may be controlled by remote wireless signal. FIG. 4 illustrates a water valve 15 disposed in a water line 27, FIG. 5 illustrates an electrical circuit breaker 16 in communication with the mains line of an electrical circuit breaker box 28, and FIG. 6 illustrates a gas valve 17 disposed in a gas line 29. The control system and utility shut-off devices 15, 16 and 17 may also be designed to shut off delivery of utilities in the event of power loss, such that in a non-powered circumstance the water valve 15 and gas valve 17 are in the closed position.

In addition, a seismic sensor 12 is incorporated whereby in the event of a significant seismic occurrence the utility shut-off devices 15, 16 and 17 are initiated to halt delivery of water, gas and electricity to the room or building even if the light blocking member 18 is inserted within the slotted card receiver 24, in effect overriding the presence of the light blocking member 18. Suitable seismic sensors to accomplish this function are well known. Preferably the seismic wave motion is measured promptly and accurately by a high sensitivity and fast-responding built-in accelerometer that comes preconfigured especially for a particular geographical area. Customers may have the option of requesting a particular activation magnitude for the seismic earthquake sensor 12 depending on the customer's buildings seismic risk.

It is understood that equivalents and substitutions to elements set forth and described above may be obvious to those of skill in the art, and therefore the true scope and definition of the invention is to be as et forth in the following claims.

I claim:

1. A utilities control system comprising:
   a DC powered control system located within a building or room and comprising in combination an occupant activation device, a seismic sensor and a wireless transmitter;
   a wireless receiver in combination with a utilities shut-off device;
   wherein said occupant activation device comprises the combination of a light transmitter, a light detector and a removable light blocking member positioned to prevent light from said light transmitter from reaching said light detector, whereby removal of said light blocking member changes the status of said occupant activation device;
   whereby upon either a change in status of said occupant activation device or the sensing of a seismic event by said seismic sensor, a signal is transmitted from said wireless transmitter to said wireless receiver such that said utilities shut-off device is activated.

2. The system of claim 1, wherein said occupant activation device further comprises a slotted card receiver and said light blocking device comprises a card that is insertable and removable from said slotted card receiver.

3. The system of claim 1, wherein said utilities shut-off device is a water valve disposed in a water line.

4. The system of claim 1, wherein said utilities shut-off device is an electrical circuit breaker incorporated in communication with an electrical circuit breaker box.

5. The system of claim 1, wherein said utilities shut-off device is a gas valve disposed in a gas line.

6. The system of claim 1, further comprising a plurality of said wireless receivers and a plurality of said utilities shut-off devices.

7. The system of claim 6, wherein one of said utilities shut-off devices is a water valve disposed in a water line and another of said utilities shut-off devices is an electrical circuit breaker incorporated in communication with an electrical circuit breaker box.

8. The system of claim 7, wherein still another of said utilities shut-off devices is a gas valve disposed in a gas line.

9. The system of claim 6, wherein one of said utilities shut-off devices is a water valve disposed in a water line and another of said utilities shut-off devices is a gas valve disposed in a gas line.

10. The system of claim 6, wherein one of said utilities shut-off devices is an electrical circuit breaker incorporated in communication with an electrical circuit breaker box and another of said utilities shut-off devices is a gas valve disposed in a gas line.

11. A utilities control system comprising:
   a wall-mounted, DC powered control system located within a building or room and comprising in electronic communication an occupant activation device, a seismic sensor and a wireless transmitter;
   one or more utilities shut-off devices each in electronic communication with a wireless receiver;
   wherein said occupant activation device comprises the combination of a light transmitter, a light detector, a slotted card receiver and a removable light blocking member positionable within said slotted card receiver to prevent light from said light transmitter from reaching said light detector, whereby insertion of said light blocking member into said slotted card receiver sends a signal from said wireless transmitter to said one or more wireless receivers to allow utilities to be delivered and whereby removal of said light blocking member from said slotted card receiver sends a signal from said wireless transmitter to said one or more wireless receivers to activate said utilities shut-off device to stop delivery of said utilities;
   and further whereby upon the sensing of a seismic event by said seismic sensor, a signal is transmitted from said wireless transmitter to said one or more wireless receivers to activate said utilities shut-off device to stop delivery of said utilities even if said light blocking member is positioned within said slotted card receiver.

12. The system of claim 11, wherein one of said one or more utilities shut-off devices is a water valve.

13. The system of claim 11, wherein one of said one or more utilities shut-off devices is a gas valve.

14. The system of claim 11, wherein one of said one or more utilities shut-off devices is an electrical circuit breaker.

* * * * *